United States Patent
Daniel et al.

(10) Patent No.: US 7,545,760 B1
(45) Date of Patent: Jun. 9, 2009

(54) METHODS AND SYSTEMS FOR PROVIDING AN EXTENSION SERVICE TO WIRELESS UNITS AND WIRELINE UNITS

(75) Inventors: John S. Daniel, Lawrenceville, GA (US); Daniel L. Rogers, Blairsville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 09/345,668

(22) Filed: Jun. 30, 1999

Related U.S. Application Data

(60) Provisional application No. 60/091,260, filed on Jun. 30, 1998.

(51) Int. Cl.
*H04B 7/00* (2006.01)
(52) U.S. Cl. ...................................... 370/310
(58) Field of Classification Search ............ 379/221.01, 379/258; 370/310, 328, 351, 357, 312; 455/461, 455/414, 462, 465
See application file for complete search history.

(56) References Cited

U.S. PATENT DOCUMENTS

| | | | | |
|---|---|---|---|---|
| 3,787,632 A | * | 1/1974 | Male et al. ............. | 379/115.01 |
| 4,802,199 A | * | 1/1989 | Lange et al. ........... | 379/216.01 |
| 5,247,571 A | * | 9/1993 | Kay et al. ................... | 370/385 |
| 5,282,244 A | * | 1/1994 | Fuller et al. ............. | 379/114.28 |
| 5,353,331 A | * | 10/1994 | Emery et al. ........... | 379/221.08 |
| 5,422,941 A | * | 6/1995 | Hasenauer et al. ..... | 379/114.29 |
| 5,430,719 A | | 7/1995 | Weisser, Jr. | |
| 5,467,390 A | * | 11/1995 | Brankley et al. ........ | 379/221.08 |
| 5,539,817 A | * | 7/1996 | Wilkes ........................ | 370/410 |
| 5,724,660 A | * | 3/1998 | Kauser et al. ............. | 455/456.2 |
| 5,758,281 A | * | 5/1998 | Emery et al. ............ | 379/114.28 |
| 5,758,286 A | * | 5/1998 | Leppanen .................... | 455/445 |
| 5,841,854 A | * | 11/1998 | Schumacher et al. ........ | 379/224 |
| 5,892,821 A | * | 4/1999 | Turner .................... | 379/207.15 |
| 5,920,619 A | * | 7/1999 | Karppinen ............. | 379/220.01 |
| 6,011,975 A | * | 1/2000 | Emery et al. ................. | 379/230 |
| 6,130,935 A | * | 10/2000 | Shaffer et al. .......... | 379/127.03 |

OTHER PUBLICATIONS

Blank, Uyless. ISDN and SS7. 1997, Prentice Hall, pp. 249-274.*

* cited by examiner

*Primary Examiner*—Dmitry Levitan
(74) *Attorney, Agent, or Firm*—Moazzam & Associates, LLC

(57) ABSTRACT

A call from a wireline unit to a wireless unit may be made by the wireline unit using an extension of the wireless unit rather than a wireless number of the wireless unit. A table includes an entry for the wireless unit that includes the wireless extension and a corresponding wireless number of the wireless unit. The extension is used to obtain the corresponding wireless number from the entry for the wireless unit in the table. The call then is routed pursuant to the obtained corresponding wireless number. Similarly, the inclusion of wireless units in the communications network allows for calls using extensions between a wireless unit and a wireline unit, between wireless units, and of course, between wireline units.

11 Claims, 6 Drawing Sheets

| Reference No. | EXTENSION | NPA-NXX-XXXX |
|---|---|---|
| \[CLASS OF SERVICE TABLE\] | | |
| 310 | 4310 | 404-555-4310 |
| 312 | 4312 | 404-555-4312 |
| 314 | 4314 | 404-555-4314 |
| 316 | 4316 | 404-555-4316 |
| 318 | 4318 | 404-555-4318 |
| 320 | 4320 | 404-555-4320 |
| 322 | 4322 | 404-555-4322 |
| 324 | 4324 | 404-555-4324 |
| 350 | 4326 | 678-234-0337 |
| 352 | 4328 | 678-234-0339 |
| 354 | 4330 | 678-234-0341 |
| 356 | 4332 | 678-234-0343 |

CLASS OF SERVICE TABLE

— 200

| 220 | | 240 |
|---|---|---|
| 4453 | 404-555-4453 | |
| 4454 | 404-555-4454 | |
| 4455 | 404-555-4455 | |
| 4456 | 404-555-4456 | |

FIGURE 2

| CLASS OF SERVICE TABLE | | |
|---|---|---|
| Reference No. | EXTENSION | NPA-NXX-XXXX |
| 310 | 4310 | 404-555-4310 |
| 312 | 4312 | 404-555-4312 |
| 314 | 4314 | 404-555-4314 |
| 316 | 4316 | 404-555-4316 |
| 318 | 4318 | 404-555-4318 |
| 320 | 4320 | 404-555-4320 |
| 322 | 4322 | 404-555-4322 |
| 324 | 4324 | 404-555-4324 |
| 350 | 4326 | 678-234-0337 |
| 352 | 4328 | 678-234-0339 |
| 354 | 4330 | 678-234-0341 |
| 356 | 4332 | 678-234-0343 |

FIGURE 5

METHODS AND SYSTEMS FOR PROVIDING AN EXTENSION SERVICE TO WIRELESS UNITS AND WIRELINE UNITS

RELATED APPLICATION

The present application claims priority to and the benefit of the prior filed copending and commonly owned provisional application entitled "Method and Apparatus for Integrating Wireless and Wireline Centrex Services", filed in the United States Patent and Trademark Office on Jun. 30, 1998, and assigned Application No. 60/091,260.

FIELD OF THE INVENTION

The subject matter of the present invention relates to telecommunications, and particularly, relates to telecommunications systems, networks, or services that allow units operating in the systems to contact each other by using a shortened form of a directory or unit number or other substitute for the directory or unit number.

BACKGROUND

Specialized telecommunications systems and services have been developed to serve particular telecommunication needs. An example of such a specialized telecommunications system is a Centrex telephone network, which may also be referred to herein as an extension service. Generally stated, a person using a telecommunications unit in a Centrex network may call another person in the same Centrex network simply by using a shortened dialing number such as a shortened form of a directory, unit, or extension number or other substitute rather than using the complete directory or unit number. For example, assume a business such as Tarheel Mfg. subscribes to a Centrex network that assigns a four digit extension to each of the telecommunications units used at Tarheel Mfg. An employee of Tarheel Mfg. may call a co-worker simply by dialing the co-worker's four digit extension. Advantageously, the employee does not have to retrieve and input any more than four digits in order to reach any other co-worker at Tarheel Mfg. In addition, the implementation of the Centrex network may save Tarheel Mfg. money over the cost of conventional telecommunications service provided to the telecommunications units used at Tarheel Mfg.

FIG. 1 is a block diagram of a Centrex telephone network 100 operated by a local exchange carrier ("LEC"). The network 100 includes a plurality of individual telephone lines 110-124. The telephone lines 110-124 are assigned to an organization or group of organizations. The LEC assigns each line a seven digit calling line number including a three-digit NXX prefix, and a four digit XXXX suffix, where "N" is a numeral between 1 and 9, and "X" is a numeral between 0 and 9. In addition, each line within the network is located within a geographic area, with several lines within a single area being assigned a Numbering Plan Area code ("NPA"). Thus, to call a line within the network from outside the network, the caller dials the NPA-NXX-XXXX of the particular line. Certain calls also may require an additional prefix of 0 or 1.

Although the lines 110-124 are part of a single organization, the lines need not be located in a single geographic location. For example, lines 110-116 may be located in Atlanta, Ga. Lines 118-124 may be located in Washington, D.C. Calls from lines 110-116 are switched through switching equipment, such as a computer, located in an end office 140. Calls from lines 118-124 are switched through switching equipment located in a second end office 142. The end offices 140, 142 may be coupled through one or more tandem offices 144.

Within the Centrex network 100, callers need not dial the entire NPA-NXX-XXXX to reach an internal calling line. Instead, internal callers dial only the four digit XXXX suffix (also referred to herein as "extension"). When the extension is dialed, callers are automatically switched to the calling line within the network containing that suffix. To prevent duplicate switching, all four digit XXXX extension within the network are unique.

This "automatic" connection between callers within the network is performed by one or more end office switches 140, 142. Each end office switch includes switching technology that connects calls from one group of calling lines to other lines connected to that switch. For calls to other calling lines, an end office may switch the call to another end office that is coupled to the destination calling line. Additional networking components may be involved, including Signaling System 7 ("SS7") elements and Advanced Intelligent Network ("AIN") elements. For additional information on the public switched telephone network ("PSTN"), SS7 and the AIN, the interested reader is referred to the commonly assigned patent to Weisser, Jr., U.S. Pat. No. 5,430,719, which is incorporated herein by reference.

The LEC assigns all of the lines 110-124 to a single "Class of Service" ("COS"). A COS includes a table or group of tables within a switch that specify how calls are to be switched from calls made from lines within the COS. For instance, lines 110-124 would be assigned to a single COS. All calls made from those lines would be assigned to a table or group of tables within the end office.

FIG. 2 illustrates a sample COS table 200 stored in an end office. The table 200 contains information for switching calls within Centrex network 100. The table 200 includes two fields. The dialed number field 220 contains a four digit XXXX suffix dialed by a caller within the Centrex network. The calling line number field 240 contains the full NPA-NXX-XXXX (or NXX-XXXX for areas where ten digit dialing is not required) corresponding to the directory number (DN) of the calling line. A directory number is also referred to herein as a calling line number. For example, referring to FIG. 2, a caller within the Centrex network dialing an extension of 4453 is connected to the party within the Centrex network, who has been assigned the extension of 4453, but whose calling line number is 404-555-4453. The table 200 may store additional information as well, such as the name of the party having the calling line number indicated in field 240.

Centrex networks or extension services have been welcomed by subscribers who enjoy the benefits of: (1) shortened dialing numbers for use in dialing others within the network or service; and (2) cost savings over conventional telecommunications services. These subscribers have sought ways to extend their Centrex networks to keep up with their changing telecommunications needs. A relatively recent change in telecommunications is the increased use of wireless units. A wireless unit may be a cellular phone, a personal communications system (PCS) device, pager, or the like.

For example, Tarheel Mfg. may employ a sales staff and equip each of its sales representatives with a wireless unit. Unfortunately, a typical Centrex network is a landline or wireline network, and as such, is unable to include a wireless unit as a terminating unit in the Centrex network. In other words, the president of Tarheel Mfg. is unable to reach the sales representatives through shortened four-digit dialing in the Centrex network. Rather, the president has to dial the complete unit number of the wireless unit of the particular sales representative the president is trying to reach. This can mean that the president has to retrieve and input up to ten digits to reach the particular sales representative. In addition, the president's call does not benefit from the cost savings that are accorded to calls in the Centrex network.

Therefore, there is a need for methods and systems that extend Centrex networks, extension services, and similar networks and services, to keep up with changing telecommunications needs of subscribers.

There is a particular need for methods and systems that extend Centrex networks, extension services, and similar networks and services so as to include wireless units as terminating units in a Centrex or similar network and/or to provide extension or similar services to the wireless units.

SUMMARY

Stated generally, the present invention relates to the extension of a Centrex or similar network to include wireless units as well as wireline units, and to the provision of extension or similar services to wireless units as well as wireline units. Advantageously, the present invention allows a subscriber to a Centrex or similar network to include wireless and wireline units so that the units may call each other by using a shortened dialing number. The inclusion of the wireless units in the Centrex or similar network may integrate or otherwise connect the subscriber's previously separate wireline and wireless communications systems. At least one advantage of the integration of the subscriber's communications systems is that the subscriber may save money in terms of telecommunications service fees and in terms of costs related to the hardware aspects of the telecommunications service. Another advantage is that a wireline or wireless unit to which extension service has been provided may use a shortened form of dialing to reach another wireline or wireless unit to which the extension service also has been provided.

More particularly stated, exemplary embodiments of the present invention may be used in a telecommunications system including a wireless network having a mobile switching center (MSC), and including a wireline network. The wireline network may include a communications network such as the Centrex network wherein, heretofore, only wireline units operating in the communications network may call each other by using wireline extensions rather than wireline directory numbers. The wireline extension may be a shortened form of the wireline directory number, or the wireline extension may be a substitute for the wireline directory number. Exemplary embodiments of the present invention provide for the inclusion of wireless units in the Centrex or similar network, or extend the extension service previously provided only to wireline units to include wireless units as well.

Generally, to implement the communications network such as the Centrex network, the communications network includes one or more communications elements with access to a table of entries. A communications element may be a private branch exchange (PBX), an end office of the wireline network, a mobile switching center (MSC), a service control point (SCP), an intelligent network element (INE), or an intelligent peripheral (IP). The entries in the table correspond to the units (wireless and/or wireline) operating in the communications network. Each entry includes an extension and a corresponding directory number or wireless number as appropriate to a wireline unit or a wireless unit.

The communications element is operative to access the table to obtain the corresponding directory number or wireless number in response to receipt of an extension (or other shortened dialing form) in association with a call to a unit operating in the communications network. A unit "operates" in the communications network if it has been accorded extension service or set up to operate in the communications network such that the unit may contact other units operating in the communications network by using an extension or a shortened dialing form. Upon receipt of the extension, the communications element may access a table or other appropriate data storage device to convert the extension or shortened dialing form to a corresponding directory number or wireless number. The communications element routes the call pursuant to the obtained corresponding number. In this manner, the wireline units and the wireless units operating in the communications network may call each other by using a shortened dialing number.

An exemplary embodiment of the present invention provides a method to include a wireless unit of a wireless network in a communications network so that a call from a wireline unit operating in the communications network to the wireless unit may be made by the wireline unit using an extension of the wireless unit rather than a wireless number of the wireless unit. Pursuant to this method, a table accessible to the communications network includes an entry for the wireless unit. The entry includes the wireless extension of the wireless unit and a corresponding wireless number of the wireless unit.

When the wireline unit calls the wireless unit, the wireline unit uses the extension of the wireless unit. The extension is received, and in response, the extension is used to obtain the corresponding wireless number from the entry for the wireless unit in the table. The call then is routed pursuant to the obtained corresponding wireless number. According to this method, the wireless unit is included in the communications network so that the call from the wireline unit operating in the communications network and directed to the extension of the wireless unit results in the routing of the call to the corresponding wireless number of the wireless unit based on obtaining the corresponding wireless number from the entry for the wireless unit in the table.

Accordingly, it is an object of the present invention to provide methods and systems that extend Centrex and similar networks and extension and similar services to keep up with changing telecommunication needs of subscribers.

It also is an object of the present invention to provide methods and systems that extend Centrex and similar networks and extension and similar services so as to include wireless units as terminating units.

That the present invention and the exemplary embodiments accomplish the objects of the invention will become apparent from the detailed description of the exemplary embodiments and the drawings which follow.

BRIEF DESCRIPTION OF THE DRAWINGS

FIG. 2 is a sample Class of Service ("COS") table such as may be used with the exemplary Centrex telephone network of FIG. 1.

FIG. 5 is an exemplary COS table such as may be used with the exemplary embodiments of FIG. 3 or 4.

DETAILED DESCRIPTION

Generally, the present invention relates to the extension of a Centrex or similar network or extension or similar services to include wireless units as well as wireline units. Advantageously, the present invention allows a subscriber to a Centrex or similar network or extension or similar service to include wireless units and wireline units so that the units may call each other by using a shortened dialing number such as an extension of four digits. The inclusion of the wireless units in the Centrex or similar network or extension or similar service may integrate the subscriber's previously separate wireline and wireless communications systems. At least one advantage of the integration of the subscriber's communications systems is that the subscriber may save money in terms of telecommunications service fees and in terms of costs related to the hardware aspects of the telecommunications service. Another advantage is that a wireline or wireless unit to which extension service has been provided may use a shortened form of dialing to reach another wireline or wireless unit to which the extension service also has been provided.

Figure 1:
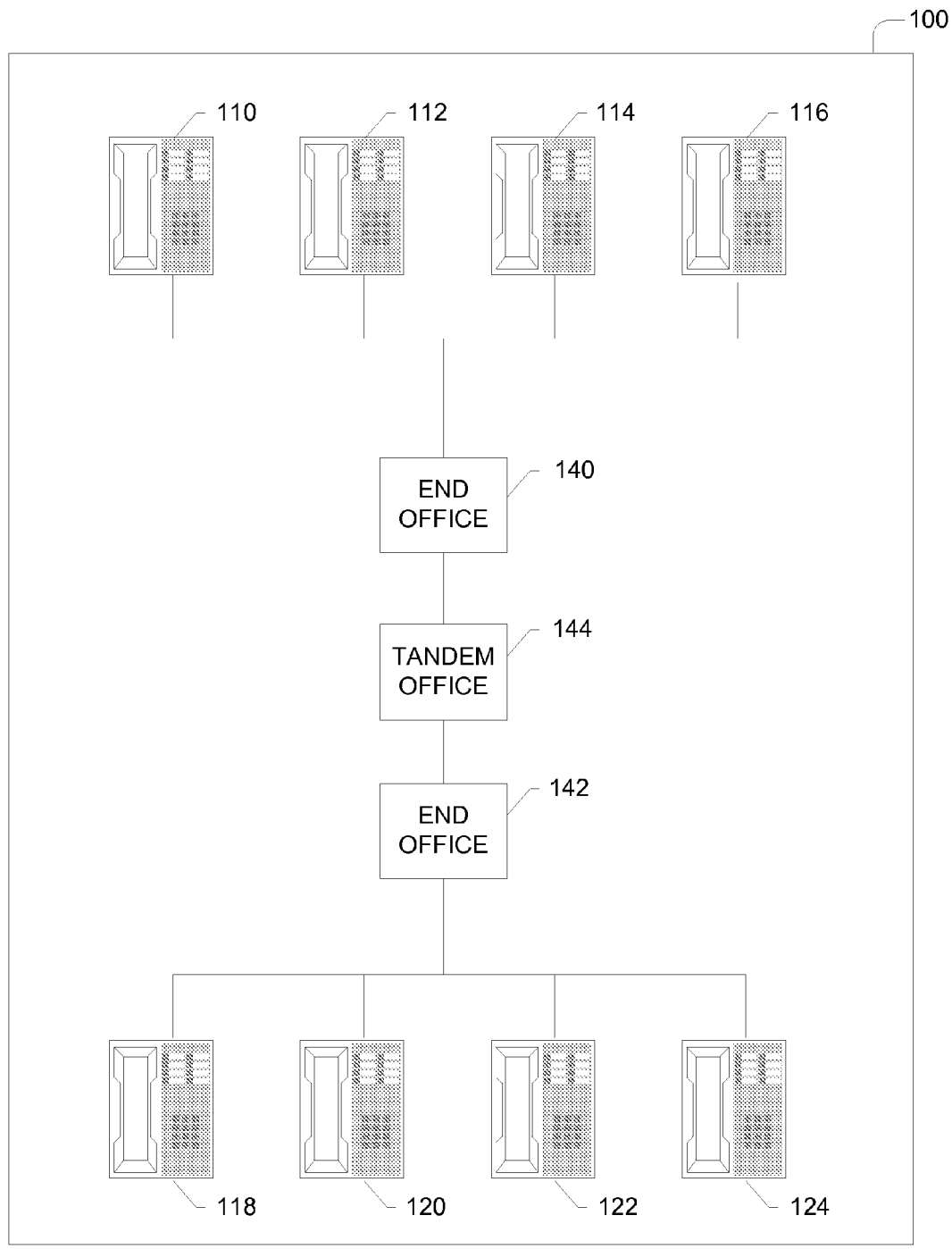
FIG. 1 is a block diagram of an exemplary Centrex telephone network operated by a local exchange carrier ("LEC").
Figure 3:
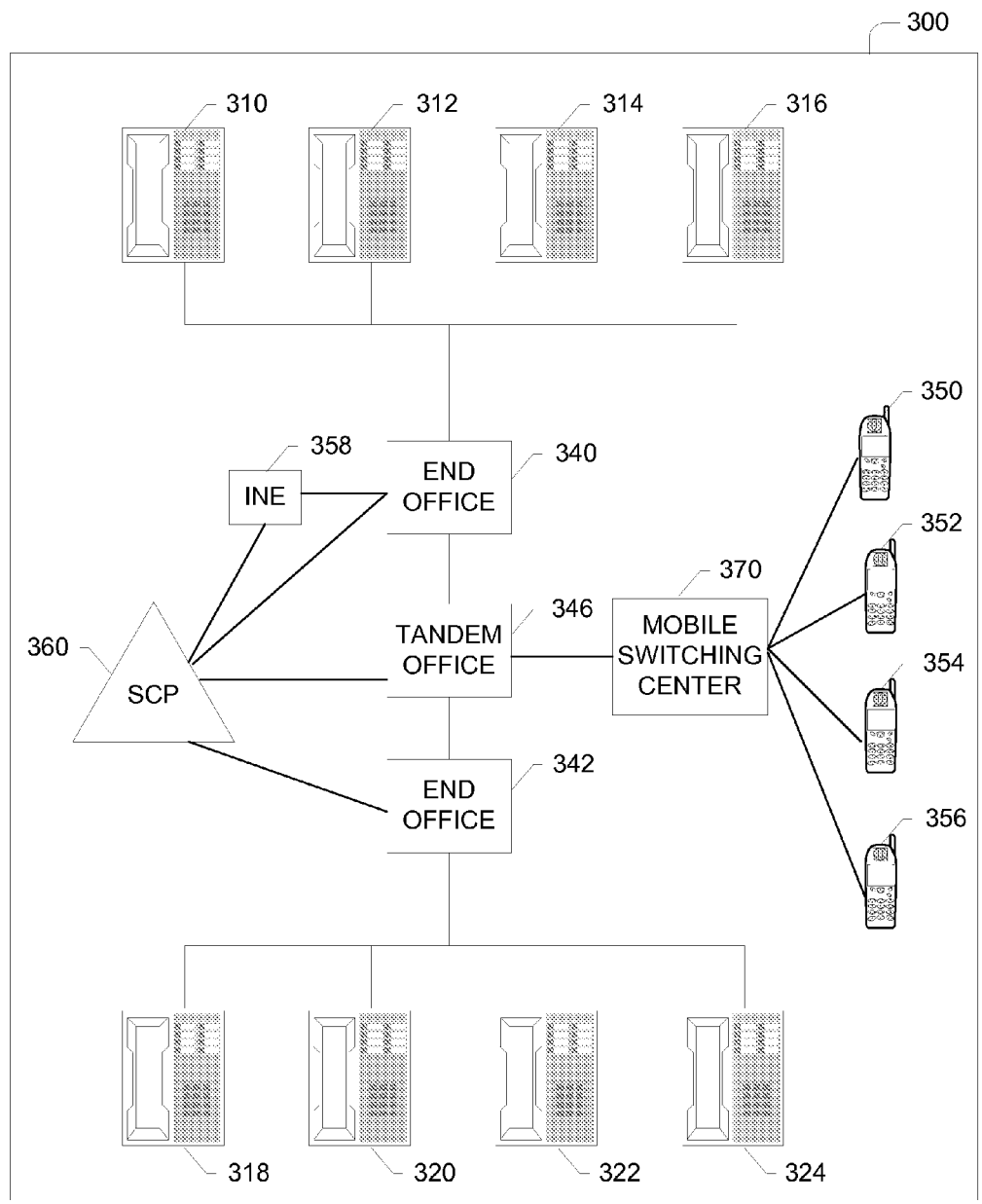
FIG. 3 is a block diagram of a Centrex or similar network according to an exemplary embodiment of the present invention.
Figure 4:
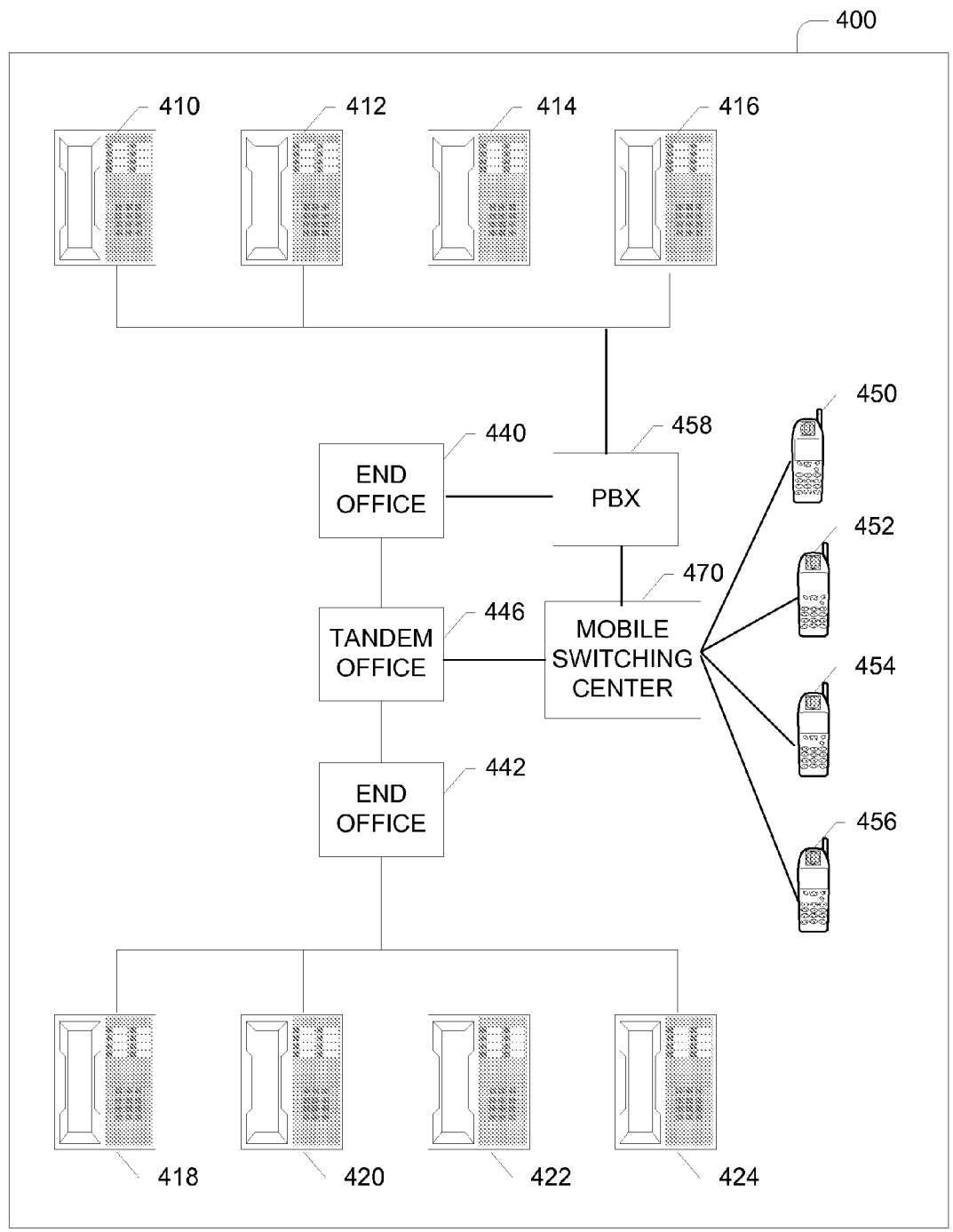
FIG. 4 is a block diagram of a telecommunications system according to another exemplary embodiment of the present invention.

FIGS. 3-4—Exemplary Environments for Exemplary Embodiments

FIG. 3 is a block diagram of a Centrex network 300 according to an exemplary embodiment of the present invention. The Centrex network 300 includes a plurality of landline telephones 310-324 that are connected either to an end office 340 or to an end office 342. Each of the end offices 340, 342 is connected to a tandem office 346, and is therefore, connected to the other end office. The end offices, tandem office 346, and wireline units 310-324 may be considered to constitute part of the wireline network. FIG. 3 also illustrates other wireline network elements including an intelligent network element (INE) 358 and a service control point (SCP) 360. An INE 358 generally is connected to the wireline network through one or more end offices such as the connection to end office 340. An INE 358 also may have a connection to the SCP 360. Generally, the SCP 360 is connected to end offices 340, 342, and tandem offices 346 as well as other network elements (not illustrated).

FIG. 3 also illustrates that a mobile switching center (MSC) 370 is connected to the wireline network through the tandem office 346. The MSC 370 serves wireless units 350-356. The MSC 370 and the wireless units 350-356 may be considered to constitute part the wireless network.

FIG. 4 is a block diagram illustrating another exemplary embodiment of the present invention. In this embodiment, some of the wireline units 410-416 are connected to a private branch exchange (PBX) 458 rather than to an end office. The PBX 458 is connected to an end office 440, which in turn, is connected to a tandem office 446. The tandem office 446 is connected to another end office 442 to which the other wireline units 418-424 illustrated in FIG. 4 are connected. The tandem office 446 also is connected to an MSC 470, which is connected to the wireless units 450-456 illustrated in FIG. 4. The MSC 470 also is connected to the PBX 458.

Exemplary embodiments of the present invention are implemented through the use of a table such as the exemplary Class of Service ("COS") table 500 illustrated in FIG. 5. Generally stated, a table such as the exemplary COS table 500 may be stored and accessed for use in implementing the Centrex or similar network or the extension or similar service at an end office(s), PBX, MSC, INE, intelligent peripheral (IP) such as a service node or a service circuit node, and/or an SCP or like device. The storage of a table to implement the extension or similar service or Centrex or similar network is more particularly described by the following examples.

EXAMPLE 1

FIG. 3—Distributed Scheme—A table 500 may be stored for access at each of the end offices 340, 342 and each of the MSCs such as MSC 370 that implement the communications network. When an end office or an MSC receives a call directed to an extension ("an extension call"), the end office or MSC accesses the table, converts the extension to a corresponding directory number or wireless number, and routes the call pursuant to the corresponding number.

EXAMPLE 2

FIG. 3—Centralized Scheme—A table 500 may be stored for access at a centralized location such as an INE 358, an SCP 360, a selected one of the end offices 340, 342, or the MSC 370. When an end office or an MSC receives an extension call, the end office or MSC routes a query or other request to the centralized location storing the table 500. In response to receiving the query or request, the centralized location accesses the table, converts the extension to a corresponding directory number or wireless number, and provides instructions to the end office or MSC to route the call pursuant to the corresponding number.

EXAMPLE 4

FIG. 4—PBX/MSC—Distributed Scheme—A table 500 may be stored for access at each PBX 458 in the communications network and each of the MSCs such as MSC 470 that implement the communications network. When a PBX or an MSC receives an extension call, the PBX or MSC accesses the table, converts the extension to a corresponding directory number or wireless number, and routes the call pursuant to the corresponding number.

EXAMPLE 4

FIG. 4—PBX/MSC—Centralized Scheme—A table 500 may be stored for access at a centralized location such as a PBX 458 in the communications network or the MSC 470. When a PBX or an MSC receives an extension call, the PBX or MSC routes a query or other request to the centralized location storing the table 500. In response to receiving the query or request, the centralized location accesses the table, converts the extension to a corresponding directory number or wireless number, and provides instructions to the end office or MSC to route the call pursuant to the corresponding number.

FIG. 5—Exemplary COS Table

Additional information regarding an exemplary COS table 500 is now provided with reference to FIG. 5. The table 500 includes an entry for each unit operating in the Centrex network 300 illustrated in FIG. 3. In other words, the table 500 includes an entry for each unit which is qualified for extension service as hereinafter described. The table 500 includes three columns: Reference No. column 502; Extension column 504; and NPA-NXX-XXXX column 506. The table 500 also includes twelve rows with each row representing an entry in the table. For ease of explanation, the entries in the table 500 are referenced by the reference numerals assigned to the units 310-324 operating in the Centrex network 300 illustrated in FIG. 3. Thus, the entry 310 in Reference No. column 502 in the table 500 corresponds to the wireline unit 310 illustrated in FIG. 3 as connected to end office 340. The reader will understand that the Reference No. column 502 and information therein are included in this description and FIG. 5 for purposes of explanation of the table 500, and ordinarily would not be included in such a table.

Referring again to entry 310 in table 500, the extension for the unit 310 is included in the Extension column 504 of the entry 310 as "4310". As used herein, an extension refers to the shortened number used by callers using units in the Centrex network 300 to call each other. An extension also may be referred to as a suffix. Instead of an extension, other or substitute identifiers may be used to refer to the unit 310. The other or substitute identifiers need not necessarily be shorter or fewer in digits than the corresponding NPA-NXX-XXXX or NXX-XXXX of the unit. The interested reader will note that the extension "4310" for the unit 310 conveniently corresponds to the last four digits of the NPA-NXX-XXXX ("404-555-4310") of the unit 310 also for ease of reference. No such direct correspondence is necessary, and the relationship between an extension and a corresponding number may be completely arbitrary.

Referring yet again to entry 310 in table 500, the NPA-NXX-XXXX for the unit 310 is included in the NPA-NXX-XXXX column 506 of the entry 310 as "404-555-4310". Each wireless unit and wireline unit has a respective corresponding calling line number. With respect to a wireless unit, the corresponding calling line number may be referred to as a wireless number. With respect to a wireline unit, the corresponding calling line number may be referred to as a wireline number, a directory number (DN), or a wireline directory number. The calling line number is in the NPA-NXX-XXXX or NXX-XXXX format. To call a unit in the network 300 from a unit outside of the network 300, a caller dials the NXX-XXXX or the NPA-NXX-XXXX of the unit. As used in connection with FIGS. 3 and 5, the NPA-NXX-XXXX or the NXX-XXXX refers to the digits that are dialed (plus in some cases a "1", "0", or other digits) by a caller using a unit outside the Centrex network (or to whom extension service is not provided) to a called party using a unit in the Centrex network 300 (or to whom extension service is provided).

In addition, the NPA-NXX-XXXX or the NXX-XXXX is the number used by wireline and wireless networks to route calls. Thus, the NPA-NXX-XXXX or the NXX-XXXX or a wireline or wireline unit operating in the Centrex network 300 is the information that is needed to properly route a call within the Centrex network 300 when a caller has used an extension to place the call. The table 500 allows for the conversion of an extension to its appropriate NPA-NXX-XXXX or NXX-XXXX so the call may be properly routed.

Table 500 in FIG. 5 is now further explained. The first eight entries 508 in table 500 correspond to wireline units 310-324 operating in the Centrex network 300 of FIG. 3. Each of these entries for the wireline units has a corresponding NPA-NXX-XXXX. In this example, the wireline entries have at least the NPA-NXX-XX portions of their NPA-NXX-XXXX's in common. In other words, each of these wireline units 310-324 has a wireline directory number which includes 404-555-43XX.

The last four entries 510 of the table 500 correspond to the wireless units 350-356 operating in the Centrex network 300 of FIG. 3. Each of these entries for the wireless units has a corresponding NPA-NXX-XXXX. But the NPA-NXX-XXXX's of the wireless units do not have elements in common with the NPA-NXX-XXXX's of the wireline units. The NPA-NXX-XXXX's of the wireless units are 678-234-03XX as compared to the 404-555-43XX of the wireline units. Generally, wireless units have different NPA-NXX-XXXX's than wireline units, and so the differences reflected in table 500 should come as no surprise. But it is this very difference between wireline units and wireless units that makes the respective directory number or wireless numbers of co-workers difficult to memorize, retrieve, etc.

Advantageously, the embodiments of the present invention allow a subscriber to a Centrex network to assign extensions, other or substitute identifiers that are easier to memorize than the varying NPA-NXX-XXXX's that would be used without the Centrex network or an extension service. For example, referring to table 500, the Extension column 504 includes the twelve exemplary extensions for the units 310-324 and 350-356 operating in the Centrex network 300 of FIG. 3. These extensions are four digits and all include 43XX. Unlike the NPA-NXX-XXXX's of the wireless units and wireline units operating in the Centrex network 300, the extensions as illustrated by Extension column 504 have at least two of the four digits in common. This commonality in extensions is present whether the unit is a wireless or a wireline unit. Thus, a co-worker has an easier time memorizing, retrieving, or otherwise using a number that is an extension of a co-worker.

As an example of the advantages of the exemplary embodiments, assume Tarheel Mfg. had not as yet installed the Centrex network or extension service of the exemplary embodiments. But Tarheel Mfg. had installed a Centrex network as explained in the background, supra. In that case, a Tarheel employee seeking to reach a Tarheel co-worker, who is using a wireless unit, has to memorize or otherwise obtain the wireless number of the wireless unit. If the co-worker's wireless number is 678-234-0337, then the caller must memorize or otherwise obtain and dial the ten digits of the wireless number. This task is made more difficult by the fact that the wireless number probably bears no relationship to the wireline numbers assigned to Tarheel's wireline units.

On the other hand, once Tarheel Mfg. installs a Centrex network pursuant to the exemplary embodiments, then the caller need only memorize or otherwise retrieve and dial an extension of four digits as opposed to a complete NPA-NXX-XXXX of ten digits. Moreover, the extension may be assigned in such a fashion so that it is easy for callers to memorize, retrieve, or deduce. The extensions may be assigned based on some numbering scheme that does not necessarily distinguish between wireline and wireless units. For example, all of the extensions in FIG. 5 (wireline and wireless) include two digits in common ("43XX"). Advantageously, the caller need only memorize, retrieve, or deduce the last two digits for any co-worker at Tarheel Mfg. Of course, a numbering scheme for the extensions may distinguish between wireline and wireless units. For example, wireline units may be assigned extensions that are even numbers while wireless units may be assigned extensions that are odd numbers.

Figure 6:
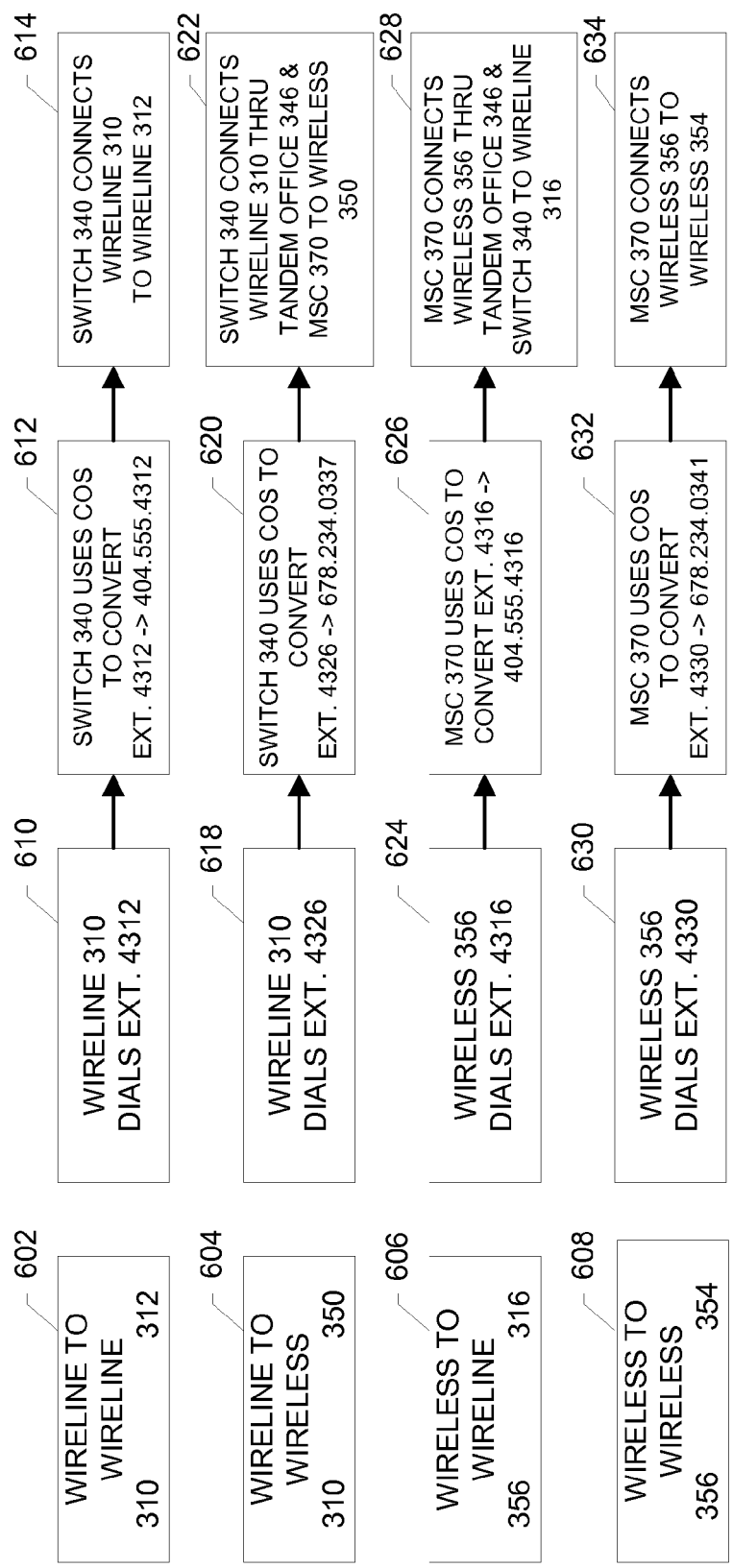
FIG. 6 is a block diagram illustrating exemplary call flows such as may take place in connection with the exemplary embodiments of FIG. 3 or 4.

FIG. 6—Exemplary Calls within a Centrex Network

FIG. 6 is a block diagram illustrating four exemplary call flows such as may take place in connection with the exemplary embodiments of FIGS. 3-5: wireline to wireline 602; wireline to wireless 604; wireless to wireline 606; wireless to wireless 608. As is explained below, prior to the exemplary embodiments of the present invention, only the first call flow (wireline to wireline 602) would have been possible. Advantageously, the exemplary embodiments add at least three more variations of call flows.

In the first call flow, wireline to wireline 602, assume wireline unit 310 dials extension 4312 (action 610). This call is received at switch 340, which uses the COS table 500 to convert the extension to the corresponding directory number of 404-555-4312 (action 612). The switch 340 then routes the call pursuant to the directory number (action 614). In this call flow, the two wireline units are served by the same switch (end office 340), and so switch 340 may simply connect the call to the wireline unit 312 by using the corresponding directory number.

The second call flow would not have been possible prior to the exemplary embodiments of the present invention because calls between wireline and wireless units were not previously possible in a Centrex or similar network or in the provision of extension or similar services. In the second call flow, wireline to wireless 604, assume wireline unit 310 dials extension 4326 (action 618). This call is received at switch 340, which uses the COS table 500 to convert the extension to the corresponding wireless number of 678-234-0337 (action 620). The switch 340 then routes the call pursuant to the wireless number to the wireless unit 350 through the tandem office 346 to the MSC 370 serving wireless unit 350 (action 622).

The third call flow also would not have been possible prior to the exemplary embodiments of the present invention. In the third call flow, wireless to wireline 606, assume wireless unit 356 dials extension 4316 (action 624). This call is received at MSC 370, which uses the COS table 500 to convert the extension to the corresponding directory number of 404-555-4316 (action 626). The MSC 370 then routes the call pursuant to the directory number to the wireline unit 316 through the tandem office 346 to the switch 340 serving wireline unit 316.

The fourth call flow also would not have been possible prior to the exemplary embodiments of the present invention. In the fourth call flow, wireless to wireless 608, assume wireless unit 356 dials extension 4330 (action 630). This call is received at MSC 370, which uses the COS table 500 to convert the extension to the corresponding wireless number of 678-234-0341 (action 632). The MSC 370 then routes the call pursuant to the wireless number to the wireless unit 354.

Advantageously, the exemplary embodiments of the present invention provide for the inclusion of wireless units as well as wireline units in Centrex or similar network or in extension or similar services. By this inclusion of wireless units, there are four possible call flows using extensions among the units instead of just a single call flow. The inclusion of wireless units allows for the integration of a customer's wireline network and wireless network. At least one advantage of the integration of the customer's communications systems is that the customer may save money in terms of telecommunications service fees and in terms of costs related to the hardware aspects of the telecommunications services. Another advantage is that a wireline or wireless unit to which extension service has been provided may use a shortened form of dialing to reach another wireline or wireless unit to which the extension service also has been provided. Such shortened form of dialing is convenient and efficient.

CONCLUSION

From the foregoing description of the exemplary embodiments of the present invention and operation thereof, other embodiments will suggest themselves to those skilled in the art. Therefore, the scope of the present invention is to be limited only by the claims below and equivalents thereof.

We claim:

1. In a telecommunications system including a wireless network having a mobile switching center (MSC) and including a wireline network, the wireline network having a communications network wherein wireline units operating in the communications network may call each other by using wireline extensions rather than wireline directory numbers, the communications network having a communications element with access to a table with wireline entry including a wireline extension and a corresponding wireline directory number, a system for including wireless units of the wireless network in the communications network so the wireline units and the wireless units operating in the communications network may call each other by using the wireline extensions or wireless extensions rather than by using the wireline directory numbers or wireless numbers, the system comprising:

A. the table stored within the communications element or the MSC, the table comprising a wireless entry for each of the wireless units operating in the communications network, each wireless entry including a wireless extension and a corresponding wireless number for the wireless unit, wherein each extension is assigned utilizing a numbering scheme to distinguish between the wireless and wireline units, wherein the numbering scheme comprises assigning wireless extensions which are only even numbers and assigning wireline extensions which are only odd numbers, wherein each wireless extension comprises at least the last four digits of the corresponding wireless number, wherein the extension is associated with a user of one of the wireless units;

B. the communications element being operative to store the table, access the table to obtain the corresponding wireless number in response to receipt of the wireless extension in association with a call to the wireless unit, receive routing instructions from a service control point (SCP), and the communications element being further operative to route the call pursuant to the corresponding wireless number based on the routing instructions receiving from the SCP, wherein the communications element comprises a single element in the telecommunications system; and C. the MSC of the wireless network being functionally connected to the communications element, the MSC serving at least one or more wireless units operating in the communications network, the MSC being operative to access the table to obtain, respectively, the corresponding wireless number or wireline directory number in response to receipt of the wireless extension or wireline extension in association with a particular call to the wireless unit or to a wireline unit, wherein each wireline extension comprises at least the last four digits of the corresponding wireline directory number, and the MSC being operative to store the table, receive routing instructions from the SCP, and based on the routing instructions received route the particular call pursuant to the corresponding wireless number or the corresponding wireline number, wherein the communications element comprises a public branch exchange (PBX), at least one end office of the wireline network serving the wireline units operating in the communications network, or the MSC and whereby the wireline units and the wireless units operating in the communications network may call each other by using an appropriate wireline extension or an appropriate wireless extension, having the appropriate wireline extension or wireless extension converted respectively to an appropriate wireline directory number or an appropriate wireless number through access of the table by the communications element or by the MSC, and having the call routed pursuant to the appropriate wireline directory number or the appropriate wireless number.

2. The system of claim 1, wherein the communications network comprises a Centrex network.

3. The system of claim 1, wherein the communications element and the MSC comprise the table.

4. The system of claim 1, wherein the table is stored in a distributed scheme, the distributed scheme comprising the table stored for access at each end office and each MSC that implements the communications network wherein the end office or MSC receiving a call directed to an extension is operative to:
   access the table;
   convert the extension to a corresponding directory number or wireless number; and
   route the call pursuant to the corresponding directory number or wireless number.

5. The system of claim 1, wherein the table is stored in a centralized scheme, the centralized scheme comprising the table stored for access at a selected end office or the MSC wherein any end office or MSC that implements the communications network and receives a call directed to an extension is operative to route one of a query or request to the selected end office or MSC storing the table and wherein the selected end office or MSC in response to receiving one of the query and request is operative to:
   access the table;
   convert the extension to a corresponding directory number or wireless number; and
   provide instructions to the any end office or MSC receiving the call to route the call pursuant to the corresponding directory number or wireless number.

6. The system of claim 1, wherein the table is stored in a distributed scheme, the distributed scheme comprising the table stored for access at each PBX in the communications network and each MSC that implements the communications network wherein when a PBX or MSC receive a call directed to an extension, the PBX or MSC receiving the call:
   accesses the table;
   converts the extension to a corresponding directory number or wireless number; and
   routes the call pursuant to the corresponding directory number or wireless number.

7. The system of claim 1, wherein the table is stored in a centralized scheme, the centralized scheme comprising the table stored for access at a selected PBX or the MSC wherein any PBX in the communications network or MSC that receives a call directed to an extension is operative to route one of a query or request to the selected PBX or MSC storing the table and wherein the selected PBX or MSC in response to receiving one of the query and request is operative to:
   access the table;
   convert the extension to a corresponding directory number or wireless number; and
   provide instructions to the any PBX or MSC receiving the call to route the call pursuant to the corresponding directory number or wireless number.

8. In a communications network including wireline units and wireless units, a communications element accessible for use in providing an extension service to the wireline units and the wireless units operating in the communications network, the extension service allowing the wireline units and the wireless units to call each other by using wireline extensions or wireless extensions rather than wireline directory numbers or wireless numbers, the communications element comprising:

A. a table for use in providing the extension service to the wireline units and the wireless units;

B. the table including a wireline entry for each wireline unit, each wireline entry including a wireline extension and a corresponding wireline directory number, wherein each extension is assigned utilizing a numbering scheme to distinguish between the wireless and wireline units, wherein the numbering scheme comprises assigning wireless extensions which are only even numbers and assigning wireline extensions which are only odd numbers, wherein each wireline extension comprises at least the last four digits of the corresponding wireline directory number, wherein the extension is associated with a user of one of the wireless units; and C. the table also including a wireless entry for each wireless unit, each wireless entry including a wireless extension and a corresponding wireless number, wherein each wireless extension comprises at least the last four digits of the corresponding wireless number, wherein the table is stored within and calls are routed from at least one of a private branch exchange (PBX), and end office, or a mobile switching center (MSC), all operative to receive routing instructions from a SCP, and route the calls pursuant to a corresponding wireless or wireline number based on the routing instructions received from the SCP, the communications element comprising a single element in the communications network.

9. In a communications network including a wireline network having a wireline unit and a wireless network having a wireless unit, a method to provide the wireless unit with extension service whereby the wireless unit may call the wireline unit by using an extension for the wireline unit rather than a directory number for the wireline unit, the method comprising:

A. causing a table to include an entry for the wireline unit and a plurality of additional wireless units operating in the communications network, each entry including the extension of the wireline unit and a corresponding directory number of the wireline unit, wherein each extension is assigned utilizing a numbering scheme to distinguish between the wireless and wireline units, wherein the numbering scheme comprises assigning wireless extensions which are only even numbers and assigning wireline extensions which are only odd number, wherein each wireline extension comprises at least the last four digits of the corresponding wireline directory number, wherein the extension is associated with a user of one of the wireless units;

B. receiving the extension for the wireline unit in association with a call from the wireless unit to the wireline unit;

C. using the extension to obtain the corresponding directory number for the wireline unit by checking the entry for the wireline unit in the table; and D. routing the call from where the table is stored to the corresponding wireline directory number, wherein the table is stored within and the call is routed from a single communications element in the communications network, the single communications element operative to receive routing instructions from an SCP, and whereby the wireless unit is accorded the extension service so that a call from the wireless unit to the wireline unit may be made by the wireless unit using the extension of the wireline unit and result in the routing of the call by the single communications element to the corresponding directory number of the wireline unit based on obtaining the corresponding directory number from the entry for the wireline unit in the table.

10. The method of claim 9, further comprising:
causing the table to include a wireless unit entry for the wireless unit, the wireless unit entry including the extension of the wireless unit and a corresponding wireless number of the wireless unit, inclusion of the wireless unit entry in the table signifying the wireless unit is to receive the extension service, wherein each wireless extension comprises at least the last four digits of the corresponding wireless directory number;
wherein Action B comprises receiving the wireless number of the wireless unit in association with the call from the wireless unit to the wireline unit; and
in response to Action B and prior to Action C, using the wireless number to determine the wireless unit is to receive the extension service by finding the wireless unit entry for the wireless unit in the table.

11. The method of claim 9, whereby the wireless unit may call a second wireless unit by using an extension for the second wireless unit rather than a directory number for the second wireless unit, further comprising
causing the table to include an entry for the second wireless unit, the entry including the extension of the second wireless unit and a corresponding directory number of the second wireless unit;
receiving the extension for the second wireless unit in association with a wireless call from the wireless unit to the second wireless unit;
using the extension to obtain the corresponding directory number for the second wireless unit by checking the entry for the second wireless unit in the table; and
routing the wireless call from where the table is stored to the corresponding wireless directory number,
wherein the table is stored within and the wireless call is routed from the single communications element, and whereby the wireless unit is accorded the extension service so that the wireless call from the wireless unit to the second wireless unit may be made by the wireless unit using the extension of the second wireless unit and result in the routing of the wireless call to the corresponding directory number of the second wireless unit based on obtaining the corresponding directory number from the entry for the second wireless unit in the table.

\* \* \* \* \*